United States Patent [19] [11] 4,101,615
Horikiri et al. [45] Jul. 18, 1978

[54] PROCESS FOR PRODUCING ALUMINA FIBER OR ALUMINA-SILICA FIBER

[75] Inventors: Shozo Horikiri, Amagasaki; Kozo Tsuji, Ibaraki; Yasuaki Abe, Toyonaka; Akio Fukui, Ibaraki; Eiichi Ichiki, Niihama, all of Japan

[73] Assignee: Sumitomo Chemical Company, Limited, Osaka, Japan

[21] Appl. No.: 606,023

[22] Filed: Aug. 20, 1975

Related U.S. Application Data

[63] Continuation-in-part of Ser. No. 443,245, Feb. 19, 1974, abandoned.

[30] Foreign Application Priority Data

Feb. 20, 1973 [JP] Japan .................................. 48-20568
Jun. 5, 1973 [JP] Japan .................................. 48-64231

[51] Int. Cl.$^2$ .......................... C01F 7/02; C04B 35/64
[52] U.S. Cl. ........................................ 264/63; 106/65; 106/73.4; 264/DIG. 19; 264/65
[58] Field of Search .................... 264/63, 65, DIG. 19; 106/65, 73.4

[56] References Cited

U.S. PATENT DOCUMENTS

| 2,915,475 | 12/1959 | Bugosh | 252/313 |
| 2,944,914 | 7/1960 | Bugosh | 106/308 |
| 3,031,418 | 4/1962 | Bugosh | 252/313 |
| 3,231,540 | 1/1966 | Vanderbilt | 260/41.5 |
| 3,634,112 | 1/1972 | Yavorsky et al. | 106/55 |
| 3,846,527 | 11/1974 | Winter et al. | 264/63 |
| 3,950,478 | 4/1976 | Kenworthy et al. | 264/DIG. 19 |
| 3,992,498 | 11/1976 | Morton et al. | 264/176 Z |
| 4,010,233 | 3/1977 | Winter et al. | 264/63 |

Primary Examiner—Jay H. Woo
Attorney, Agent, or Firm—Birch, Stewart, Kolasch and Birch

[57] ABSTRACT

A process for producing alumina fiber or alumina-silica fiber having excellent mechanical strength and heat resistance, comprising (i) spinning a solution of at least one polyaluminoxane or of a mixture of at least one polyaluminoxane and one or more kinds of silicon-containing compounds in an organic solvent, (ii) hydrolyzing the resulting precursor fiber, and then (iii) calcining the hydrolyzed fiber, said polyaluminoxane being one or more kinds of polymers or copolymers which mainly consist of the structural units of the formula:

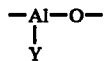

wherein the pendant groups Y are one or more kinds of groups selected from the group consisting of an alkyl, an alkoxy, an acyloxy, phenyl and phenoxy, and which may be partially a halogen or hydroxy.

18 Claims, No Drawings

PROCESS FOR PRODUCING ALUMINA FIBER OR ALUMINA-SILICA FIBER

This is a Continuation-in-part application of U.S. Ser. No. 443,245, filed on Feb. 19, 1974, now abandoned.

This invention relates to the methods for producing alumina fiber and alumina-silica fiber having excellent mechanical strength and heat resistance by spinning a solution of polyaluminoxanes or of a mixture of polyaluminoxanes and one or more kinds of silicon-containing compounds and then calcining the resulting precursor fiber.

With the recent technical development in various industrial fields, e.g. the aerospace industry, there have been desired materials which are more excellent in their properties such as mechanical strength and heat resistance and more easily available than those presently used.

One possibility for producing such material is to reinforce a conventional plastic, metal, or ceramic with a carbon fiber; a fiber of metal such as tungsten, molybdenum or steel; a conjugated fiber obtained by coating the surface of tungsten fiber with boron or silicon carbide, a polycrystalline fiber such as alumina fiber or zirconia fiber; or a whisker such as silicon carbide, to give a composite material.

It has been attempted to use alumina or alumina-silica fiber as a reinforcement for composite materials, since they are known to be stable in an oxidative atmosphere and at a high temperature, in which a carbon fiber or metal fiber can not be used, and are expected to retain their excellent properties such as mechanical strength even at a high temperature owing to the high melting point (higher than 1590° C) of an alumina or alumina-silica solid solution.

Alumina-silica fiber is usually produced by melt-spinning of alumina-silica minerals. However, according to this method, the fiber produced is usually short fiber and occasionally contains 30 to 50% by weight of granulated particles called "shots". Forming of a continuous fiber from the melt requires an apparatus made of special materials because the melting point of the starting material is high. Further, it is very difficult to obtain alumina-silica fiber containing 70% or more by weight of alumina which has more excellent heat resistance, due to the low spinnability of the melt.

As alternative processes for the production of alumina fiber and alumina-silica fiber, there have been proposed some methods comprising producing a precursor fiber by spinning an aqueous solution or dispersion or slip of aluminum compounds or of alumina sol or particles, to which appropriate additives such as silicon compounds, organic polymers, and deflocculants may be added, and then calcining the resultant. However, some of these methods provide only short fibers or thick fibers having a fiber diameter of 100 microns or less, in some methods the starting materials are expensive or must be submitted to many pretreatments so as to make then spinnable, or some methods are too complicated for industrial production. Further, these methods have generally a fatal defect that the obtained alumina fiber or alimina-silica fiber is not dense since the corresponding precursor fiber has low alumina or alumina-silica content, e.g. at most 25% by weight, or consists of loosely bonded particles with little or no ceramic bonding matrix, and that its mechanical strength is consequently too weak to be used as a reinforcement for composite materials.

Processes for producing monocrystalline alumina short fiber (whisker) or continuous fiber have been also proposed. However, the whiskers are too small in their dimensions to be handled easily in preparing composite materials and continuous monocrystalline fibers are too expensive.

Under the circumstances, the present inventors have conducted studies to find a new process for producing alumina fiber or alumina-silica fiber having excellent mechanical strength and heat resistance and have now found that the desired alumina fiber or alumina-silica fiber having extremely excellent mechanical strength and heat resistance, which is in the form of a short fiber, a long fiber or a continuous fiber, can be produced by spinning a solution of a polyaluminooxane or of a mixture of a polyaluminoxane and an appropriate amount of a silicon-containing compound, hydrolyzing the resulting precursor fiber, and calcining the hydrolyzed fiber having a high content of alumina or alumina-silica.

An object of the present invention is to provide a new process for producing alumina fiber or alumina-silica fiber having extremely excellent mechanical strength and heat resistance.

Another object of the invention is to provide a process for producing alumina fiber or alumina-silica fiber, which is in the form of short fiber, long fiber, or continuous fiber.

These and other objects of the invention will be apparent from the description hereinafter.

The process of the present invention comprises (i) spinning a solution of at least one polyaluminoxane or of a mixture of at least one polyaluminoxane and one or more kinds of silicon-containing compounds, (ii) hydrolyzing the resulting precursor fiber, and then (iii) calcining the hydrolyzed fiber. The polyaluminoxane has a structural unit of the formula:

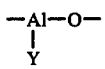

where Y is mostly an organic group such as alkyl, alkoxy, and so on, and is dissovled in an organic solvent, to which an appropriate amount of one or more kinds of silicon-containing compounds are added, and the concentration of the polymer is adjusted so that the solution has a viscosity suitable for spinning. Precursor fiber is formed from the solution by the usual dry-spinning method, and then the fiber is preferably treated with humid air to convert the alkyl or alkoxy group represented by Y in the above formula to a hydroxyl group by hydrolysis. The fiber after hydrolysis consists of amorphous or glassy alumina hydrate having a few broad halos in its X-ray diffraction pattern which coincides with none of the X-ray diffraction patterns of known alumina mono- or trihydrates or pseudo-boehmite, and has a high alumina or alumina-silica content of 40% or more by weight. The precursor fiber is finally calcined and heat-treated up to a temperature between 600°–1700° C and thereby is converted to alumina or alumina-silica fiber. The alumina or alumina-silica fiber thus obtained is amorphous, or polycrystalline, or in between them, which depends on the maximal temperature of the heat treatment and the silica content of the fiber. When the maximal temperature of the heat treatment is relatively low, the product is a clear, transparent fiber having an extremely high tensile strength as the result of the high alumina or alumina-silica content of the precursor fiber, which has rather broad peaks in its X-ray diffraction pattern which are assigned to γ-alumina and, usually, to amorphous silica. When the maximal temperature of the heat treatment is relatively high, the product is a dense, polycrystalline fiber having an excellent heat resistance, which has sharp peaks of α-alumina, cristobalite and/or of mullite crystals in its X-ray diffraction pattern.

The polyaluminoxane used in the present invention generally dissolves in an organic solvent, such as dioxane, benzene and so on to give a viscous solution having large spinnability which can be easily spun, and further, the main chain of the polyaluminoxane is composed of repeating units of aluminum and oxygen and therefore it has high alumina content. For instance, polyethylaluminoxane contains about 71% by weight of alumina. The silicon-containing compound to be mixed with the polyaluminoxane may have high silica content, for instance dimethyl polysiloxane contains about 81% by weight of silica. Furthermore, the alumina hydrate contained in the precursor fiber after hydrolysis is amorphous or glassy and therefore dense and non-porous. These features in the present invention enable us to produce easily an alumina fiber or lumina-silica fiber alumina-silica extremely high denseness, being non-porous and having high mechanical strength.

The invention will now be described in more detail.

Polyaluminoxanes

The polyaluminoxanes used in the invention are one or more kinds of polymers or copolymers which mainly consist of the structural units of the formula:

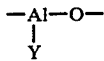

wherein the pendant groups Y are one or more kinds of groups selected from alkyl groups, alkoxy groups, acyloxy groups, phenyl groups and phenoxy groups, or may be partially a halogen atom, or hydroxyl groups, and may contain cross-linkages of the formula:

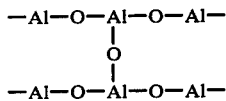

the amount of which in the polymer molecule should be within the range that the polymer is soluble in an organic solvent. The averge degree of polymerization of the polyaluminoxanes should be in the range of from 5 to 1,000, preferably from 10 to 200 in order to give a good spinnability to the solution. A spinning solution may contain two or more kinds of polyaluminoxanes as well as only one kind of polyaluminoxane.

The polyaluminoxanes used as the starting material must be soluble in an organio solvent. That is, they must satisfy the following conditions:

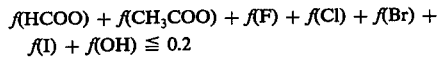

wherein $f(R)$ means the mole fraction for a particular group: R as defined for the pendant group Y, or $$f(R) = \frac{\text{Number of group: } R \text{ in the polyaluminoxanes}}{\text{Number of aluminum atoms in the polyaluminoxanes}}$$

which may be in a range of from 0.0 to 1.0.

Furthermore, in order to obtain strong alumina fiber or alumina-silica fiber after the calcination, it is found that the alumina content of the polyaluminoxane or the mixture thereof used as the starting material may be preferably not less than about 30% by weight, wherein the alumina content is defined by the expression:

$$\frac{51 \text{ grams} \times \begin{pmatrix} \text{Number of moles of aluminum atoms} \\ \text{contained in the polyaluminoxanes} \end{pmatrix}}{\text{Total weight of the polyaluminoxanes}} \times 100 \, (\%)$$

This condition may be satisfied when the following expression is effected:

$$\sum_{n=1}(n-1)f(C_nH_{2n+1}) + \sum_{n=1}nf(C_nH_{2n+1}O) + \sum_{n=3}(n+1)f(C_{n-1}H_{2n-1}COO) + 4.5f(\text{phenyl}) + 5.5f(\text{phenoxy}) \leq 8$$

wherein $n$ is an integer.

The pendant groups Y of the polyaluminoxanes should satisfy the above expression, and each of the pendant groups may have up to 18 carbon atoms. That is, in the pendant groups Y, "alkyl" denotes an alkyl having 1 to 18 carbon atoms (e.g. methyl, ethyl, n-propyl, isopropyl, n-butyl, isobutyl, tert.-butyl, etc.), "alkoxy" denotes an alkoxy having 1 to 18 carbon atoms (e.g. ethoxy, n-propoxy, isopropoxy, n-butoxy, isobutoxy, tert.-butoxy, etc.), and "acyloxy" denotes an acyloxy having 1 to 18 carbon atoms (e.g. propionyloxy, butyryloxy, isobutyryloxy, lauroyloxy, myristoyloxy, palmitoyloxy, stearoyloxy, etc.).

When the polyaluminoxane is the one wherein the pendant groups Y are exclusively, for instance, the stearoyloxy group: $C_{17}H_{35}COO—$, it contains only 16% by weight of alumina, and therefore, it is very difficult to prepare the desired alumina fiber having a high strength, by using this polyaluminoxane alone as the starting material.

The polyaluminoxanes used in the invention are prepared by known methods, e.g. by partially hydrolyzing or polymerizing an organic aluminum or organoaluminum compound (e.g. triethylaluminum, triisopropylaluminum, tributylaluminum, aluminum triethoxide, or aluminum tributoxide) or by substituting the pendant groups of the polyaluminoxane by other appropriate groups. Most preferably, the polyethylaluminoxane is prepared by hydrolyzing and/or polymerizing triethylaluminum $Al(C_2H_5)_3$ in ether or dioxane with an equimolar amount of $H_2O$ which is added dropwise at 20° to 80° C:

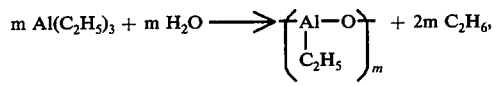

wherein $m$ means the degree of polymerization, which is usually 30 to 100 as measured by cryoscopy. By measuring the amount of $C_2H_6$ produced, the polymerization reaction can be controlled and at the same time the $f(OH)$ value can be determined, because if $x$ OH groups out of $2m$ OH's of $m$ H$_2$O molecules remain as OH in the polyaluminoxane, the amount of C$_2$H$_6$ produced is less than $2m$ by $x$, from which there can be determined $f(\text{OH}) = x/m$. The degree of polymerization can be controlled by changing the amount of H$_2$O to be added. For example, when 0.95 mole of H$_2$O is added to 1 mole of Al(C$_2$H$_5$)$_3$, the degree of polymerization of the obtained polyaluminoxane is ca. 30.

Polyaluminoxane in which a part of the pendant groups Y is OH can be prepared by adding H$_2$O in excess. Other polyaluminoxanes with various pendant groups such as alkoxy and acyloxy can be prepared by substituting the C$_2$H$_5$ groups of polyethylaluminoxane with an appropriate amount of alcohols and/or carboxylic acids.

Silicon-containing Compounds

As the silicon-containing compound to be mixed with the polyaluminoxanes, there may be used a polysiloxane having a structural unit of the formula:

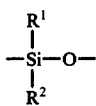

wherein R$^1$ and R$^2$ are the same or different and represent hydrogen excluding R$^1$ = R$^2$ = H, an alkyl group having 1 to 6 carbon atoms (e.g. methyl, ethyl, propyl, and butyl), an alkenyl group having 2 to 6 carbon atoms (e.g. vinyl), an alkoxy group having 1 to 6 carbon atoms (e.g. ethoxy), phenyl group, chlorine or the like, and a polysilicic acid and a polysilicic acid ester having a structural unit of the formula:

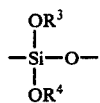

wherein R$^3$ and R$^4$ are the same or different and represent hydrogen, an alkyl group having 1 to 6 carbon atoms (e.g. methyl, ethyl, propyl, and butyl), an alkenyl group having 2 to 6 carbon atoms (e.g. vinyl), a phenyl group, chlorine or the like, but there may be used silane derivatives, excluding SiH$_4$, of the formula: R$_n^5$Si(OR$^6$)$_{4-n}$ wherein R$^5$ and R$^6$ are the same or different and represent hydrogen, an alkyl group having 1 to 6 carbon atoms (e.g. methyl and ethyl), an alkenyl group having 2 to 6 carbon atoms (e.g. vinyl), a phenyl group, chlorine or the like, and n is an integer of 1 to 4; a silicic acid and a silicic acid ester of the formula: Si(OR$^7$)$_4$ wherein R$^7$ is hydrogen, an alkyl group having 1 to 6 carbon atoms, a phenyl group or the like; and any other silicon-containing compound.

The silicon-containing compound to be mixed with the polyaluminoxanes may be preferably dissolved homogeneously into a solution of the polyaluminoxanes, but may be dispersed therein without dissolving.

The maximum amount of the silicon-containing compound to be mixed into the solution of polyaluminoxanes may vary depending on the spinnability of the silicon-containing compound per se. When a silicon-containing compound with no spinnability is mixed in an excessively large amount, the spinnability of the solution is so poor that the solution may not be formed into a fiber by any of the usual spinning methods. Thus, for the silicon-containing compounds listed above, the maximum amount is found to be such that the silica content in the alumina-silica fiber obtained after calcination is 60% by weight.

Optionally, two or more kinds of the silicon-containing compounds may be effectively mixed with the solution of the polyaluminoxane.

Further, to the spinning solution there may be preferably added less than 10 mol % in total amount of one or more kinds of the compounds containing an element such as lithium, beryllium, boron, sodium, magnesium, phosphorus, potassium, calcium, titanium, chromium, manganese, yttrium, zirconium, barium, lanthanum, or tungsten, by which the various characteristics of the alumina fiber or alumina-silica fiber are improved.

Spinning Solution and Organic Solvents

The excellency of the present alumina fiber or alumina-silica fiber is owing to the facts that the alumina hydrate contained in the precursor fiber formed from a solution of polyaluminoxanes or a mixture of polyaluminoxanes and silicon-containing compounds in an organic solvent and then hydrolysed later is amorphous, while the alumina hydrate contained in the precursor fiber formed from an aqueous solution or dispersion of alumina hydrates is polycrystalline, since water as the solvent inevitably encourages crystallization of the alumina hydrates of the solute. Precursor fibers consisting of crystallites are not suitable for producing strong fibers because the interstices between the crystallites act as voids, or defects. Consequently, it is essential to use a spinning solution of an organic solvent in the invention. A suitable organic solvent may be diethyl ether, ethyl n-propyl ether, ethyl isopropyl ether, tetrahydrofuran, dioxane, benzene, toluene, a xylene, or a mixture thereof.

The polyaluminoxanes must be soluble in an organic solvent and the pendant groups Y should be so selected. Thus, the sum of $f(\text{HCOO})$, $f(\text{CH}_3\text{COO})$, $f(\text{F})$, $f(\text{Cl})$, $f(\text{Br})$, $f(\text{I})$, and $f(\text{OH})$ of the polyaluminoxanes in the spinning solution must be not greater than 0.2. In addition, $f(\text{CH}_3\text{O}) + f(\text{C}_2\text{H}_5\text{O})$ may preferably be not greater than 0.5, since the polyaluminoxanes for which $f(\text{CH}_3\text{O}) + f(\text{C}_2\text{H}_5\text{O})$ is greater than 0.5 may not be dissolved in an organic solvent easily.

The concentration of polyaluminoxanes in the spinning solution is adjusted so that it has a viscosity of, preferably, from 1 to 5,000 poise at room termperature, by adding the solvent or distilling off the solvent at 20 to 40° C under a reduced pressure after adding an appropriate amount of silicon-containing compounds.

Spinning

When a solution of polyaluminoxanes or of a mixture of polyaluminoxanes and silicon-containing compounds is spun, it may be conveniently carried out by a dry-spinning method. The solution is extruded through an opening in the range of from 0.03 to 1 millimeter in diameter, or preferably from 0.05 to 0.5 millimeter in diameter, and the extruded filaments are wound up on a bobbin at a speed of from 20 to 400 meters per minute. There may be also used any other conventional methods such as centrifugal pot spinning or blow spinning. The spinning may be usually carried out at room temperature, but if necessary, the spinning solution may be heated at a temperature of lower than the boiling point of the solvent used in the spinning solution. The atmosphere in which the spinning is carried out is preferably controlled. Any solvent contained in the fiber thus obtained may be removed during or after the spinning step, however such removal is not necessarily needed when the fiber is thin. The diameter of the continuous precursor fiber obtained by the conventional dry-spinning method described above is usually 10 to 300 microns, i.e. about one third of the diameter of the opening through which the fiber is formed. The diameter of short fiber obtained by centrifugal pot spinning is usually in the range of from 1 to 10 microns. The shape of the cross section of the fiber produced by the present process may not necessarily be circular, but may be egg-shaped, triangular, rectangular, or of any other shape, with the area of the cross section being generally from 0.7 square micron to 0.1 square millimeter.

The spinnability of the spinning solution of the invention depends on the average degree of polymerization of the polyaluminoxanes in the solution. The spinnability of the solution of polyaluminoxanes of which the average degree of polymerization is less than 5 is found to be very poor. On the other hand, the spinnability of the solution of polyaluminoxanes of which the average degree of polymerization is larger than 1,000 is found to be also poor, probably because such polyaluminoxane having a large degree of polymerization tends to contain relatively large number of cross-linkages of the formula:

$$-Al-O-Al-O-Al-$$
$$|$$
$$O$$
$$|$$
$$-Al-O-Al-O-Al-$$

Accordingly, the average degree of polymerization of the polyaluminoxanes in the spinning solution should be in the range of from 5 to 1,000, or preferably of from 10 to 200.

Hydrolysis of Precursor Fiber

When the spinning is carried out in air, the precursor fiber formed from the polyaluminoxane is hydrolyzed by moisture contained in the air and thereby such pendant groups as alkyl and alkoxy are gradually hydrolyzed and lost:

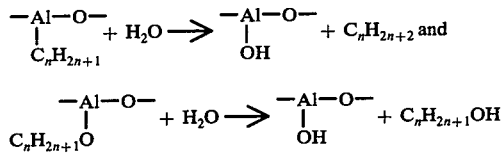

by which the content of alumina in the precursor fiber is increased and thus the mechanical properties of the alumina fiber or alumina-silica fiber obtained by calcining thereof may be preferably improved. Accordingly, such alkyl or alkoxy groups that are easily hydrolyzed and converted into volatile alkanes or alkanols are preferable pendant groups. Acyloxy groups as a pendant group are not easily hydrolyzed by moisture and thus their mole fraction may preferably be kept small. On the other hand, the precursor fibers formed from polymethylaluminoxane [$f(CH_3) = 1$] or polyethylaluminoxane [$f(C_2H_5) = 1$] are hydrolyzed too quickly and often break into a powder soon after being spun in air. Accordingly, $f(CH_3) + f(C_2H_5)$ may preferably be not greater than 0.7. According to the present inventors' new finding, the most preferable pendant groups are a combination of a large fraction of small alkoxy groups, such as iso-$C_3H_7O-$, which are easily hydrolyzed and a small fraction of large acyloxy groups, such as n-$C_{17}H_{35}COO-$ or n-$C_{15}H_{31}COO-$, which retard the hydrolysis.

The silicon-containing compound to be mixed therewith is preferably one which is easily hydrolyzed, such as polysilicic acid ethyl ester, especially having a degree of polymerization of five or so.

Furthermore, it may be preferable to contact positively the precursor fiber with humid air at 50° to 90° C with a relative humidity of 50 to 100% for 5 to 300 minutes, or an acidic aqueous solution, or to contact the fiber with moist air below 600° C during the calcination thereof to promote the hydrolysis.

The polyaluminoxanes are converted into alumina hydrate by hydrolysis. For example, the composition of the precursor fiber formed from the polyaluminoxane wherein [$f(\text{iso-}C_3H_7O) = 0.9$] and [$f(\text{n-}C_{17}H_{35}COO) = 0.1$] and then hydrolyzed is found to be:

Al: 23.45% by weight
C: 20.93 "
H: 6.49 "
O: 49.13 "

which corresponds to $Al(C_{17}H_{35}COO)_{0.1}(\text{iso-}C_3H_7O)_{0.06}(OH)_{3.2}$ or $Al_2O_3(C_{17}H_{35}COO)_{0.2}(\text{iso-}C_3H_7O)_{0.12}3.4$ $H_2O$. The alumina hydrate is amorphous. Its X-ray diffraction pattern has three broad halos centered at $2\theta \cong 20°$ (4.7 A) which is the strongest, 41° (2.2 A) and 65° (1.4 A) for the Cu-$K_\alpha$ X-ray. The pattern does not coincide with any of those of known crystalline alumina mono- or tri-hydrates, such as gibbsite, bayerite, boehmite, diaspore, or even with that of pseudo-boehmite.

Calcination and Heat Treatment

The alumina or alumina-silica precursor fiber obtained by contacting with moisture is not molten by heat, and therefore may be calcined in an atmosphere containing molecular oxygen gas, for instance in air, to give readily the desired alumina fiber or alumina-silica fiber without losing the fiber form. The precursor fiber may be substantially changed to alumina fiber or alumina-silica fiber by calcining at about 600° C in an atmosphere containing oxygen, e.g. in air, and gives the desired alumina fiber or alumina-silica fiber which is transparent and has excellent strength by heat-treating at about 1,000° to 1,200° C.

That is, when the precursor fiber is calcined in an atmosphere containing oxygen, e.g. in air, it loses water and the organic components at about 600° C and is eventually converted into transparent alumina fiber or alumina-silica fiber consisting of amorphous alumina and silica. When the fiber calcined at 600° C is further heat-treated at a higher temperature, the fiber-forming alumina and silica undergo the following transformation. For a pure alumina fiber containing no silica, the amorphous alumina is transformed into $\beta$-alumina at about 850° C, and then into $\alpha$-alumina at 1,000° to 1,100° C. For an alumina-silica fiber, a solid-state reaction between the amorphous alumina and the silica partly takes place at about 980° C to give mullite ($3Al_2O_3$·$2SiO_2$), and at the same time the remaining amorphous alumina is transformed into $\gamma$-alumina. The reaction proceeds further at still higher temperatures between the $\gamma$-alumina and the silica and is completed when the temperature reaches 1,200° C. For an alumina-silica fiber containing about 28% by weight of silica, the composition of which corresponds to that of mullite, all of the alumina and the silica are converted into mullite whereas for an alumina-silica fiber containing less than 28% by weight of silica, the excess alumina is transformed into α-alumina at 1,100° to 1,300° C which may vary depending on the silica content and for an alumina-silica fiber containing more than 28% by weight of silica, the excess silica is transformed into cristobalite at about 1,250° C. The resultant mullite crystallizes gradually and then grows into grains of 1 micron or larger in size above 1,550° C.

It has been found that there is such a specific temperature (hereinafter, referred to as the transformation temperature) that the fiber heat-treated just below the said temperature has the most excellent mechanical properties, whereas the fiber heat-treated above the said temperature is more or less brittle and has relatively low tensile strength. It has also been found that the transformation temperature corresponds to the temperature above which γ-alumina is transformed into α-alumina (in case of a pure alumina fiber or an alumina-silica fiber containing less than 25% by weight of silica), or cristobalite is formed (in case of an alumina-silica fiber containing more than 35% by weight of silica), or the growing of the mullite crystallites into grains of 1 micron or larger becomes appreciable (in case of an alumina-silica fiber containing 25 to 35% by weight of silica). The transformation temperature varies depending on the conditions of the heat treatment, such as the rate at which the temperature is raised, atmosphere, and so on, but is usually 1,000° to 1,100° C for a pure alumina fiber, 1,100° to 1,250° C for an alumina-silica fiber containing less than 25% by weight of silica, 1,250° to 1,500° C for an alumina-silica fiber containing 25 to 35% by weight of silica, or 1,200° to 1,250° C for an alumina-silica fiber containing more than 35% by weight of silica.

In order to obtain an alumina-silica fiber having excellent strength, the calcination temperature may be lower than the transformation temperature indicated above. However, for such uses as a thermal insulator where heat resistance of the fiber is required more than its mechanical properties, it is preferable to sinter the fiber at a higher temperature prior to use in order to prevent further shrinkage. In this case, the heat treatment temperature may exceed the transformation temperature indicated above and may be about 300° C lower than the melting point which varies from 1,700° to 2,050° C depending on the ratio of alumina to silica in the alumina-silica fiber. That is, the heat treatment temperature may be in a range of about 600° to 1,700° C.

The phases of forming the fiber at a temperature of from 980° C to the transformation temperature may be the γ-alumina phase and mullite phase in case of the silica content being not more than 28% by weight, and silica which is amorphous in most cases and the mullite phase in case of the silica content being more than 28% by weight. These phases may be transformed at the transformation temperature or at a higher temperature into the α-alumina phase and mullite phase, and the cristobalite and mullite phase, respectively.

Accordingly, the alumina fiber or alumina-silica fiber having large fiber strength which contains 100 to 72% by weight of alumina and 28 to 0% by weight of silica, must display substantially no α-alumina reflection by X-ray diffraction. Further, the alumina-silica fiber containing less than 72% by weight of alumina and more than 28% by weight of silica must display substantially no cristobalite reflection by X-ray diffraction.

For obtaining these alumina fiber or alumina-silica fibers, the precursor fiber may be calcined in an inert atmosphere or in a vacuum and then exposed in an atmosphere containing molecular oxygen gas and thereby the organic or carbon materials may be removed. Moreover, it is preferable to further calcine the obtained alumina fiber or alumina-silica fiber in a reducing atmosphere for improving the various characteristics of the alumina fiber or alumina-silica fiber. Furthermore, it is preferable to keep the fiber under tension during the calcination and/or heat treatment for obtaining the alumina fiber or alumina-silica fiber having excellent mechanical strength.

The precursor fiber usually shrinks to about two thirds of its original dimension both in length and diameter, and loses weight by about a half during the calcination and heat-treatment.

Alumina Fiber and Alumina-silica Fiber

The alumina fiber or alumina-silica fiber produced by the present process usually has a diameter in the range of from 0.6 to 200 microns and has a form of a short, long, or continuous fiber.

When the alumina fiber or alumina-silica fiber is calcined just below the transformation temperature described in the preceding section, the mechanical properties in case of the fiber diameter being 10 $\mu$ are tensile strength: about 15 to 20 t/cm$^2$ for the gauge length of 20 mm and tensile modulus: about 1,000 to 1,500 t/cm$^2$, for the pure alumina fiber which increase with increase of the silica content, and for the silica content of about 10 to 28% by weight, the tensile strength and the tensile modulus: about 25 to 30 t/cm$^2$ and about 2,500 to 3,500 t/cm$^2$, respectively. When the silica content increases moreover, the tensile modulus gradually decreases, and when the silica content is about 50% by weight, the tensile modulus is about 1,300 t/cm$^2$. With increase of the silica content, the tensile modulus of the fiber becomes close to that (about 700 t/cm$^2$) of silica fiber.

When the alumina fiber or alumina-silica fiber is heat-treated above the transformation temperature, the fiber strength may be decreased to 5 to 10 t/cm$^2$. However, the fiber has excellent heat resistance and shrinks by only 1% or less while being held at 1,500° to 1,600° C for 40 days.

The alumina fiber or alumina-silica fiber calcined and heat-treated at 600° to 800° C has a large specific surface area ranging from 200 to 400 m$^2$/g.

It is found by use of an X-ray microanalyzer that silicon in the form of oxides is finely and uniformly distributed in the alumina-silica fiber.

The alumina fiber or alumina-silica fiber of the present invention is useful as a reinforcing fiber for synthetic resins such as thermoplastic resins and thermosetting resins and further as a reinforcing fiber for metals because of its excellent heat resistance and mechanical strength. Moreover, the alumina fiber or alumina-silica fiber is also useful as a thermal insulator at high temperature such as higher than 1,000° C because it can be used at a high temperature in air.

The present invention is illustrated by the following Examples but is not limited thereto.

EXAMPLE 1

Monoisopropoxy-diethylaluminum (1 mol) was dissolved in ethyl ether (600 cc). The reaction vessel containing the mixture was set in an oil bath at 40° C. The distilled ethyl ether was collected by a condenser and introduced into another vessel containing water (1 mol) and thereby contacted with water and then returned to the reaction vessel. The water (1mol) was consumed in 8 hours and then the partial hydrolysis of monopropoxy-diethylaluminum was completed to give polyisopropoxyaluminoxane having a degree of polymerization of 130. The ethyl ether was evaporated to give a solution containing the polyaluminoxane in a concentration of 70% by weight. The viscosity of the solution thus obtained was 500 poises at room temperature.

The solution thus obtained was used as the spinning solution. After defoaming, the solution was extruded from a spinning nozzle of 60 $\mu$ in diameter at room temperature, and the extruded fiber was wound at a rate of 50 m/minute in air. The precursor fiber thus obtained was transparent and had a diameter of 15 $\mu$. The fiber was contacted with humid air at 80° C with a relative humidity of 80% for 20 minutes and calcined by raising the temperature from room temperature to 950° C at a rate of 300° C/hour in air to give a transparent alumina fiber having an extremely high strength. The alumina fiber thus obtained had a fiber diameter of 10 $\mu$, tensile strength of 15.1 t/cm$^2$ and tensile modulus of 1,480 t/cm$^2$. According to X-ray diffraction the fiber comprises $\gamma$-alumina.

EXAMPLE 2

Triethylaluminum (1 mol) was dissolved in dioxane (600 cc) and thereto was dropwise added dioxane (100 cc) containing water (1 mol) over 2 hours for partial hydrolysis to give polyethylaluminoxane having a degree of polymerization of 40. The temperature of the reaction mixture was kept at 50° C during the reaction. To the reaction mixture was added stearic acid (0.3 mol), by which the ethyl group (0.3 mol) contained in the polyethylaluminoxane was replaced by a stearoyloxy group. The solution containing 60% by weight of the polymer had a viscosity of 230 poises. The solution was spun in the same manner as described in Example 1 to give precursor fiber of 12 $\mu$ in diameter. The fiber was hydrolyzed by allowing it to stand in air for 5 hours and calcined by raising the temperature from room temperature to 950° C at a rate of 600° C/hour to give a transparent alumina fiber having extremely high strength. The alumina fiber thus obtained had a fiber diameter of 8 $\mu$, tensile strength of 15.1 t/cm$^2$ and tensile modulus of 1,350 t/cm$^2$.

EXAMPLE 3

To polyethylaluminoxane obtained in the same manner as in Example 2 were added stearic acid (0.1 mol) and isopropylalcohol (0.9 mol) and thereby the ethyl group (0.1 mol) and ethyl group (0.9 mol) contained in the polyethylaluminoxane were replaced by a stearoyloxy group and isopropoxy group, respectively. In the mixture was dissolved ethyl silicate (51 g) of the following formula:

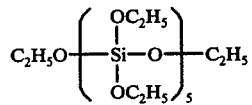

The mixture was concentrated to give a solution containing the polyaluminoxane in a concentration of 60% by weight. The viscosity of the solution thus obtained was 200 poises at room temperature. The solution was spun in the same manner as in Example 1 to give a transparent precursor fiber of 15 $\mu$ in diameter.

The precursor fiber thus obtained was contacted with humid air at 60° C with a relative humidity of 90% for 3 hours and then calcined by raising the temperature from room temperature to 1,200° C at a rate of 300° C/hour in air to give a transparent alumina-silica fiber containing 28% by weight of silica. The alumina-silica fiber thus obtained had a fiber diameter of 10 $\mu$, tensile strength of 30.1 t/cm$^2$ and tensile modulus of 3,320 t/cm$^2$. Even after the fiber was heated at 1,500° C, it was still transparent and kept its high mechanical strength.

The above procedure was repeated except that the precursor fiber was calcined without contacting with humid air. The alumina-silica fiber thus obtained had a tensile strength of 16.3 t/cm$^2$ and tensile modulus of 2,540 t/cm$^2$.

Both of the fibers obtained above comprised mullite which was confirmed by X-ray diffraction.

EXAMPLE 4

To a solution of polyisopropoxyaluminoxane obtained in the same manner as in Example 1 in ethyl ether was added benzene. The mixture was heated to remove ethyl ether to give a solution containing polyaluminoxane in a concentration of 55% by weight. In the solution was dissolved polydimethylsiloxane (27 g) and the solution was spun in the same manner as in Example 1 to give a transparent precursor fiber of 15 $\mu$ in diameter. The precursor fiber was contacted with humid air at 70° C with a relative humidity of 100% for 30 minutes and calcined by raising the temperature from room temperatue to 1,200° C at a rate of 300° C/hour in air to give transparent alumina-silica fiber containing 30% by weight of silica. The alumina-silica fiber thus obtained had a fiber diameter of 10 $\mu$, tensile strength of 23.2 t/cm$^2$ and tensile modulus of 2,780 t/cm$^2$. According to X-ray diffraction of the fiber, there was observed mostly mullite reflection and scarecely any amorphous silica reflection. Even after the fiber was heated at 1,550° C, it was still transparent.

EXAMPLE 5

To a solution of polyaluminoxane wherein 10% by mol of the organic residue is a stearoyloxy group and 90% by mol thereof is an isopropoxy group (degree of polymerization: 40) in dioxane was added $\gamma$-methacryloyloxypropyl-trimethoxysilane in such a ratio that the calcined fiber contained 10% by weight of silica. The mixture was concentrated so that the concentration of polyaluminoxane became 50% by weight, and then allowed to stand at room temperature for 12 hours, by which the $\gamma$-methacryloyloxypropyltrimethoxysilane was polymerized to give a viscous solution having excellent spinnability (viscosity: 200 poises). The solution thus obtained was spun in the same manner as in Example 1 to give a transparent precursor fiber of 10 $\mu$ in diameter.

The precursor fiber was contacted with humid air and calcined by raising the temperature from room temperature to 600° C at a rate of 300° C/hour in nitrogen, and after replacing the nitrogen by air, it was further calcined with raising the temperature to 1,200° C to give a transparent alumina-silica fiber having high mechanical strength and 6 $\mu$ in diameter.

EXAMPLE 6

To the solution of polyaluminoxane in dioxane as used in Example 5 was added tetraethoxysilane in such a ratio that the calcined fiber contained 50% by weight of silica. The mixture was concentrated so that the concentration of polyaluminoxane became 60% by weight. The solution was spun to give a precursor fiber of 15 μ in diameter.

The precursor fiber thus obtained was treated with humid air at 60° C with a relative humidity of 100% for 2 hours and then calcined by raising the temperature from room temperature to 1,150° C at a rate of 300° C/hour in air to give alumina-silica fiber of 10 μ in diameter. The alumina-silica fiber had a tensile strength of 27.8 t/cm² and tensile modulus of 1,260 t/cm². According to X-ray diffraction of the fiber, only the reflection of mullite and amorphous silica was observed.

What is claimed is:

1. A process for producing alumina fiber or alumina-silica fiber, which consists essentially of (i) spinning a solution of at least one polyaluminoxane or of a mixture of at least one polyaluminoxane and one or more kinds of silicon-containing compounds in an organic solvent to give a precursor fiber, (ii) hydrolyzing the resulting precursor fiber, and then (iii) calcining the hydrolyzed fiber, said polyaluminoxane being one or more kinds of polymers or copolymers which mainly consist of the structural units of the formula:

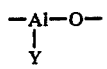

wherein the pendant members Y are one or more kinds of groups selected from the group consisting of alkyl having 1 to 18 carbon atoms, alkoxy having 1 to 18 carbon atoms, acyloxy having 1 to 18 carbon atoms phenyl and phenoxy, and may be partially a halogen or hydroxy, and which may also contain cross-linkages of the formula:

$$-Al-O-Al-O-Al-$$
$$\phantom{-Al-O-}O$$
$$-Al-O-Al-O-Al-$$

the amount of which in the polymer molecule is within the range that the polymer is soluble in the organic solvent, and said pendant groups Y of the polyaluminoxane satisfying the conditions:

$$f(HCOO) + f(CH_3COO) + f(F) + f(Cl) + f(Br) +$$
$$f(I) + f(OH) \leq 0.2$$

wherein $f(R)$ means the mole fraction for a particular group: R as defined for the pendant group Y, or

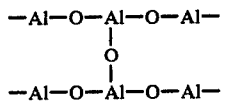

being in the range of from 0.0 to 1.0, and $$\sum_{n=1}(n-1)f(C_nH_{2n+1}) + \sum_{n=1}nf(C_nH_{2n+1}O) +$$
$$\sum_{n=3}(n+1)f(C_{n-1}H_{2n-1}COO) + 4.5f(\text{phenyl}) +$$
$$5.5f(\text{phenoxy}) \leq 8$$

wherein n is an integer, and further the average degree of polymerization of the polyaluminoxanes being in the range of 5 to 1,000, and the amount of the silicon-containing compounds to be mixed into the solution being not greater than an amount such that the silica content in the alumina-silica fiber obtained after the calcination is not greater than 60% by weight.

2. The process according to claim 1, wherein the polyaluminoxane or the mixture of polyaluminoxane and silicon-containing compounds is hydrolyzed while it is formed into fibrous form during said spinning step, instead of hydrolyzing it after being formed into fibrous form.

3. The process according to claim 1, wherein the precursor fiber which has not been hydrolyzed is hydrolyzed by humid air during the calcination step, instead of hydrolyzing the precursor fiber before the calcination.

4. The process according to claim 1, wherein the solution of polyaluminoxane or of a mixture of polyaluminoxane and silicon-containing compounds further contains at least one compound containing an element selected from the group consisting of lithium, beryllium, boron, sodium, magnesium, phosphorus, potassium, calcium, titanium, chromium, manganese, yttrium, zirconium, barium, lanthanum and tungsten, said additional compounds being contained in such an amount that the total content of the elements in the alumina fiber or alumina-silica fiber obtained after the calcination is less than 10% by mol.

5. The process according to claim 1, wherein the organic solvent is a member selected from the group consisting of diethyl ether, ethyl n-propyl ether, ethyl isopropyl ether, tetrahydrofuran, dioxane, benzene, toluene, a xylene, and mixtures thereof.

6. The process according to claim 1, wherein the solution to be spun contains as the silicon-containing compound a polysiloxane having identical or different structural units of the general formula:

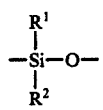

wherein $R^1$ and $R^2$ are, each independently, a hydrogen atom excluding $R^1=R^2=H$, an alkyl group having from 1 to 6 carbon atoms, an alkenyl group having from 2 to 6 carbon atoms, an alkoxy group having from 1 to 6 carbon atoms, or a phenyl group.

7. The process according to claim 1, wherein the solution to be spun contains as the silicon-containing compound a polysilicic acid or a polysilicic acid ester having identical or different structural units of the general formula:

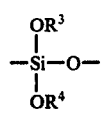

wherein $R^3$ and $R^4$ are, each independently, a hydrogen atom, an alkyl group having from 1 to 6 carbon atoms, an alkenyl group having from 2 to 6 carbon atoms, or a phenyl group.

8. The process according to claim 1, wherein the solution to be spun contains as the silicon-containing compound silane derivatives, excluding SiH$_4$, of the general formula:

$$R_n^5SI(OR^6)_{4-n}$$

wherein R$^5$ and R$^6$ are, independently, a hydrogen atom, an alkyl group having from 1 to 6 carbon atoms, an alkenyl group having from 2 to 6 carbon atoms, a phenyl group or a chlorine atom, and $n$ is an integer of from 1 to 4.

9. The process according to claim 1, wherein the solution to be spun contains as the silicon-containing compound a silicic acid or a silicic acid ester of the general formula:

$$Si(OR^7)_4$$

wherein R$^7$ is a hydrogen atom, an alkyl group having from 1 to 6 carbon atoms or a phenyl group.

10. The process according to claim 1, wherein the solution to be spun contains as the silicon-containing compound an ethyl silicate of the formula:

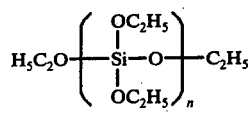

wherein $n$ is an integer of 1 or more.

11. The process according to claim 1, wherein the solution to be spun has a viscosity of from 1 to 5,000 poise at room temperature.

12. The process according to claim 1, wherein the diameter of the precursor fiber is in the range of 1 to 300 microns.

13. The process according to claim 1, wherein the average degree of polymerization of the polyaluminoxane is in the range of from 10 to 200.

14. The process according to claim 1, wherein the fiber formed from the polyaluminoxane or the mixture of polyaluminoxane and silicon-containing compounds is hydrolyzed by contacting it having a humid air at 50° to 90° C with relative humidity of 50 to 100% for 5 to 300 minutes or with an acidic solution.

15. The process according to claim 1, wherein the precursor fiber is calcined at a temperature of from 600° to 1700° C.

16. The process according to claim 1, wherein the calcination is carried out in an atmosphere containing molecular oxygen gas.

17. The process according to claim 1, wherein the calcination is carried out while the fiber is under tension.

18. The process of claim 1, wherein the precursor fiber is a non-crystalline, amorphous, dense, non-porous material.

* * * * *